United States Patent
Nouzumi

(10) Patent No.: US 7,120,985 B2
(45) Date of Patent: Oct. 17, 2006

(54) MANUFACTURING METHOD OF LAYERED CORE

(75) Inventor: Atsuo Nouzumi, Fukuoka (JP)

(73) Assignee: Mitsui High-tec, Inc., Fukuoka (JP)

( * ) Notice: Subject to any disclaimer, the term of this patent is extended or adjusted under 35 U.S.C. 154(b) by 281 days.

(21) Appl. No.: 10/230,586

(22) Filed: Aug. 29, 2002

(65) Prior Publication Data

US 2003/0066183 A1 Apr. 10, 2003

(30) Foreign Application Priority Data

Aug. 30, 2001 (JP) ............ P. 2001-261272

(51) Int. Cl.
*H02K 15/00* (2006.01)
*H02K 15/14* (2006.01)
*H02K 15/16* (2006.01)

(52) U.S. Cl. ............... 29/596; 29/597; 29/598; 29/600; 29/605; 29/609; 29/735; 310/71; 310/216; 310/254; 310/258

(58) Field of Classification Search ......... 29/596–598, 29/600, 605, 609, 735; 310/71, 216, 254, 310/258

See application file for complete search history.

(56) References Cited

U.S. PATENT DOCUMENTS 5,729,072 A * 3/1998 Hirano et al. ............... 310/258
6,127,753 A * 10/2000 Yamazaki et al. ........... 310/71
6,226,856 B1 * 5/2001 Kazama et al. .............. 29/596

* cited by examiner

*Primary Examiner*—A. Dexter Tugbang
*Assistant Examiner*—Tim Phan
(74) *Attorney, Agent, or Firm*—Wood, Phillips, Katz, Clark & Mortimer

(57) ABSTRACT

A method of manufacturing a layered core. The method includes the steps of: arranging a first plurality of yoke parts to define a first configuration magnetic pole sheet layer having first and second oppositely facing sides; arranging a second plurality of yoke parts to define a second configuration pole sheet layer having third and fourth oppositely facing sides; stacking the first plurality of yoke parts upon the second plurality of yoke parts so that the second side of the first configuration magnetic pole sheet layer is placed against the third side of the second configuration magnetic pole sheet layer; providing a circumferentially opening first female connector on a first yoke part; providing a first male connector on a second yoke part; and directing the first male connector into the first female connector.

10 Claims, 8 Drawing Sheets

MANUFACTURING METHOD OF LAYERED CORE

CROSS REFERENCE

This application claims priority to Japanese Patent Application No. 2001-261272, filed on Aug. 30, 2001.

BACKGROUND OF THE INVENTION

1. Field of the Invention

The invention concerns a method of manufacturing a layered, stationary core, such as a core of a stator on an electrical motor.

2. Background Art

A stationary core, operational and productive as a coil for a magnetic pole, is commonly manufactured using a plurality of joined sections formed, as by a punching operation, from sheet material. The sections are stacked to form portions of a magnetic pole core around which wire is wound. After winding, the partial magnetic pole core portions are assembled into a circular shape and connected to complete the stationery core. Using this method, winding of the wire is facilitated but, in assembling the magnetic pole core portions to each other, a long time may be required.

For this reason, a method has been proposed recently whereby, core portions, made as described above, are connected to each other for relative movement. In this way, assembly of the core portions after winding is easily and effectively carried out. According to this method, as shown in FIGS. 7–9, magnetic pole sheet layers 10,12, shown in FIGS. 7 and 8, respectively, having first and second different configurations, are used. The first configuration magnetic pole sheet layer 10 has a plurality of arcuate yoke parts 14,14',14", each furnished with radially spaced depressions 16 and terminating at a radially inward location at a pole part 18. On one circumferential pointed end 20,20" of each yoke part 14,14", a connector 22,22" is formed, each having a concave part 24,24" on an upper side 26 and a convex part 28,28" on a lower side 29.

The second configuration magnetic pole sheet layer 12, that is stacked with the first configuration magnetic pole sheet layer 10, has a plurality of arcuate yoke parts 30,30', 30", corresponding to the yoke parts 14,14',14". The yoke parts 14,14', 14" are each furnished with radially spaced depressions 32 and terminate at a radial inward location at a pole part 34. Each yoke part 30,30' has a pointed circumferential end 36,36' pointing oppositely to the circumferential end 20,20" on each yoke part 14,14" on the first configuration magnetic pole sheet layer 10. At the ends 36,36', a connector 38,38' is formed having a concave part 40,40' on an upper side 42 and a convex part 44,44' on a lower side 46.

With this construction, the second configuration magnetic pole sheet layers 12 are formed and alternatingly stacked with the first configuration magnetic pole sheet layers 10 so that the convex parts 44,44' of the connectors 38,38' fit within the concave parts 24,24" of the connectors 22,22" of the first configuration magnetic pole sheet layer 10. As the magnetic pole sheet layers 10,12 are stacked, the depressions 16,32 nest. With this arrangement, the magnetic pole sheet layers 10,12 can be connected so that the stacked yoke parts 14,14',14", 30,30',30" can pivot freely back and forth relative to each other at the locations of the connectors 22,22", 38,38'.

However, because the first and second configuration magnetic pole sheet layers 10,12 have yoke parts 14,14',14", 30,30',30" with oppositely pointing circumferential ends 20,20", 36,36', the layering process becomes complicated for each layering step.

Also, the formation of the concave 24,24", 40,40' and convex 28,28", 44,44' parts of the connectors 22,22", 38,38', as shown in FIG. 9, requires a punch 48 (FIG. 9) with a diameter D to advance towards a die element 49 furnished with openings 50 having a diameter D1 that is less than the diameter D. The punch 48 passes guidingly through a press plate 52, which sandwiches the sheet material 54, from which the yoke parts 14,14',14", 30,30',30" are formed, against the die element 49. In this case, if a thin metal laminate is being used for the sheet material, in constructing the first and second configuration magnetic pole sheet layers 10,12, it is difficult to stabilize the concave 24,24", 40,40' and convex 28,28", 44,44' parts. This instability at the connectors 22,22", 38,38' is a problem.

SUMMARY OF THE INVENTION

In one form, the invention is directed to a method of manufacturing a layered core having a central axis, an annular ring yoke, and a plurality of magnetic poles projecting radially inwardly from the annular ring yoke toward the central axis. The method includes the steps of: arranging a first plurality of yoke parts so as to define a first configuration magnetic pole sheet layer having first and second oppositely facing sides; arranging a second plurality of yoke parts so as to define a second configuration pole sheet layer having third and fourth oppositely facing sides; stacking the first plurality of yoke parts upon the second plurality of yoke parts so that the second side of the first configuration magnetic pole sheet layer is placed against the third side of the second configuration magnetic pole sheet layer; providing a circumferentially opening first female connector on a first yoke part on one of the first and second configuration magnetic pole sheet layers; providing a first male connector on a second yoke part on the other of the first and second configuration magnetic pole sheet layers; and directing the first male connector into the first female connector so that the first male connector is pivotable relative to the first yoke part around an axis that is substantially parallel to the central axis.

In one form, the step of directing the first male connector into the first female connector involves bending one of the first and second yoke parts to axially align the first male connector and the first female connector.

In one form, the step of directing the first male connector into the first female connector involves bending the second yoke part to axially align the first male connector and the first female connector.

The method may further include the step of punching yoke parts from a metal sheet/laminate.

The method may further include the step of stacking additional magnetic pole sheet layers to produce a desired axial dimension for the layered core.

The method may further include the steps of providing (a) a third yoke part on the first configuration magnetic pole sheet layer having a second connector similar to one of the first male connector and first female connector and (b) a fourth yoke part on the second configuration magnetic pole sheet layer having a third connector similar to the other of the first male connector and first female connector. The second and third connectors are configured to cooperate with each other in the same manner that the first male connector cooperates with the first female connector.

The step of bending one of the first and second yoke parts may involve bending one of the first and second parts with the first plurality of yoke parts stacked upon the second plurality of yoke parts.

The method may further include the step of forming at least one depression in each of the first yoke part and third yoke part. The at least one depression in the first yoke part is spaced from the first female connector. The at least one depression in each of the first and third yoke parts each define a projection and receptacle, which cooperate to maintain the first and third yoke parts in a desired relationship.

In one form, the first and second configuration magnetic pole sheet layers have the same number of yoke parts.

In one form, the step of providing a first female connector on the first yoke part involves providing a rounded opening on the first yoke part and a restricted entryway in communication with the rounded opening.

The step of providing a first male connector on the second yoke part may involve providing a stem with a head on the stem.

The invention is further directed to a method of manufacturing a layered core having a central axis, an annular ring yoke, and a plurality of magnetic poles projecting axially inwardly from the annular ring yoke toward the central axis. The method involves the steps of: arranging a first plurality of yoke parts so as to define a first configuration magnetic pole sheet layer having first and second oppositely facing sides; arranging a second plurality of yoke parts so as to define a second configuration magnetic pole sheet layer having third and fourth oppositely facing sides; stacking the first plurality of yoke parts upon the second plurality of yoke parts so the second side of the first configuration magnetic pole sheet layer is placed against the third side of the second configuration magnetic pole sheet layer; providing a circumferentially opening first female connector on a first of the yoke parts; providing a first male connector on a second of the yoke parts; and directing the first male connector into the first female connector so that the first male connector is pivotable relative to the first yoke part around an axis that is substantially parallel to the central axis.

The method may further include the step of punching the yoke parts from a metal sheet/laminate.

The method may further include the step of stacking additional magnetic pole sheet layers to produce a desired axial dimension for the layered core.

The method may further include the steps of providing a third yoke part having a second female connector and a fourth yoke part having a second male connector and directing the second male connector into the second female connector so that the second male connector is pivotable relative to the third yoke part around an axis that is substantially parallel to the central axis.

The method may further include the steps of forming at least one depression in each of the first yoke part and a third yoke part. The at least one depression in the first yoke part is spaced from the first female connector. The at least one depression in each of the first and second yoke parts defines a projection and receptacle which cooperate to maintain the first and third yoke parts in a desired relationship.

The first and second configuration magnetic pole sheet layers may have the same number of yoke parts.

In one form, the step of providing a first female connector on the first yoke part involves providing a rounded opening in the first yoke part and a restricted entryway in communication with the rounded opening.

The step of providing a first male connector on the second yoke part may involve providing a stem with a head on the stem.

BRIEF DESCRIPTION OF THE DRAWINGS

FIG. 1(*a*) is an enlarged, elevation view of a section of the layered core within the oval in FIG. 1;

DETAILED DESCRIPTION OF THE DRAWINGS

Figure 1:
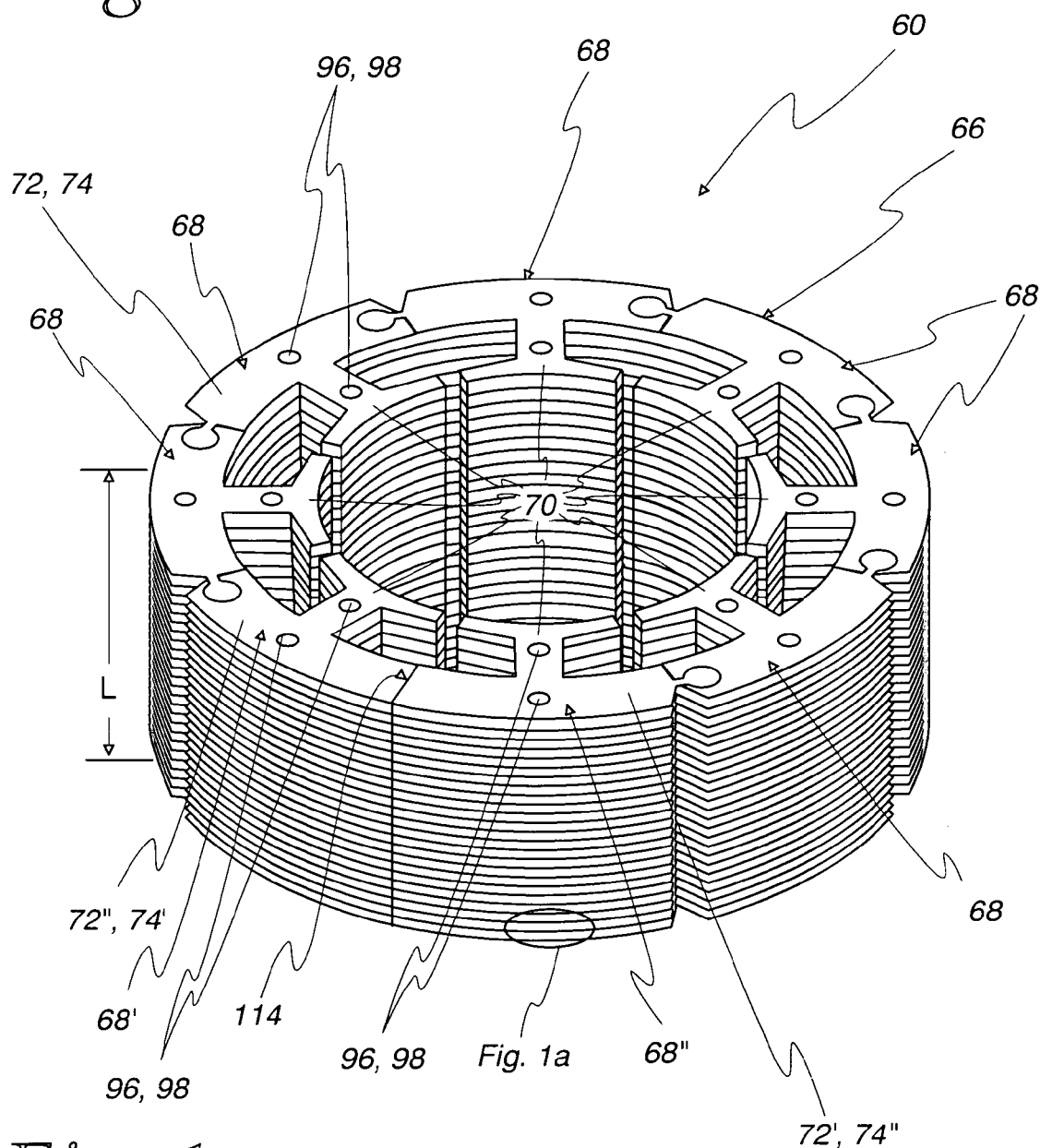
FIG. 1 is a perspective view of one form of layered core made according to the inventive manufacturing method.
Figure 1A:
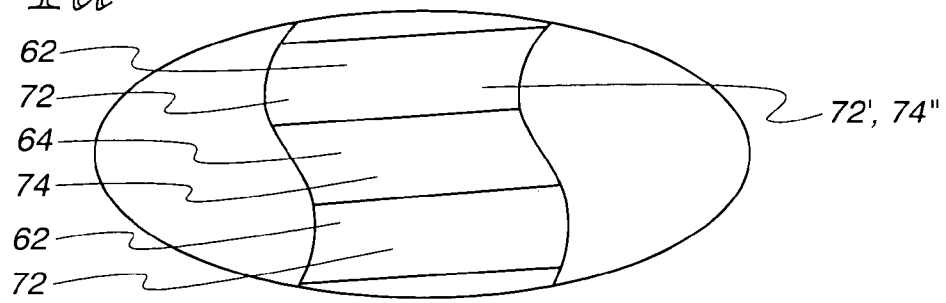

Referring to FIGS. 1–6 in the accompanying drawings, one embodiment of a layered, stationary core 60, made according to the present invention, will be described hereinbelow. As shown in FIG. 1, the layered core 60 is constructed by layering first configuration magnetic pole sheet layers 62 and second configuration magnetic pole sheet layers 64 to produce the stationary core 60 having a thickness L. The stationary core 60 has an outer ring yoke 66 made up of joined, ring yoke segments 68,68',68", in this case eight (8) in number, each with a combined layered thickness L. Each ring yoke segment 68,68',68" has a radially inwardly projecting magnetic pole 70.

Figure 2:
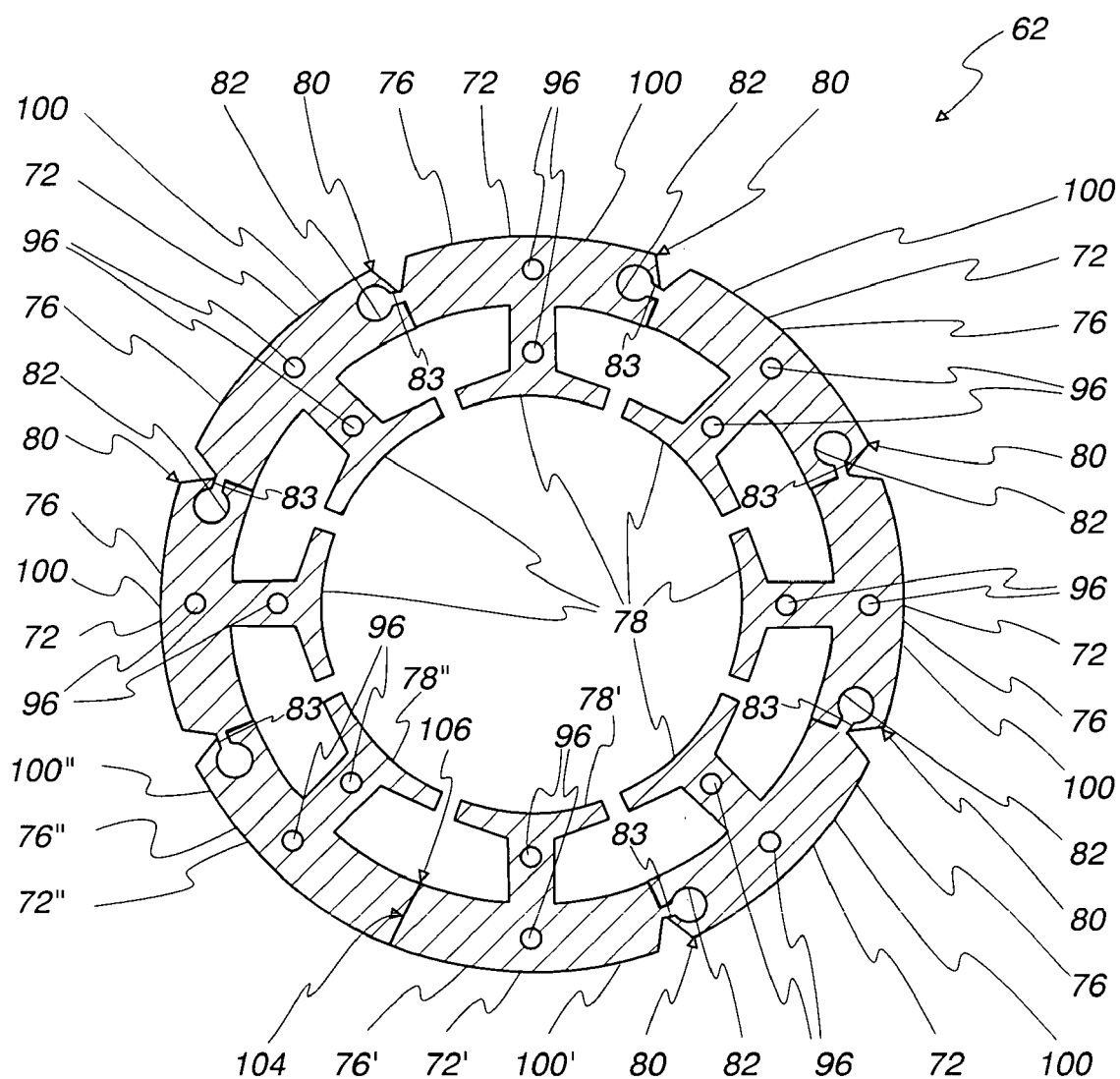
FIG. 2 is a plan view of a first configuration magnetic pole sheet layer on the layered core of FIG. 1.
Figure 3:
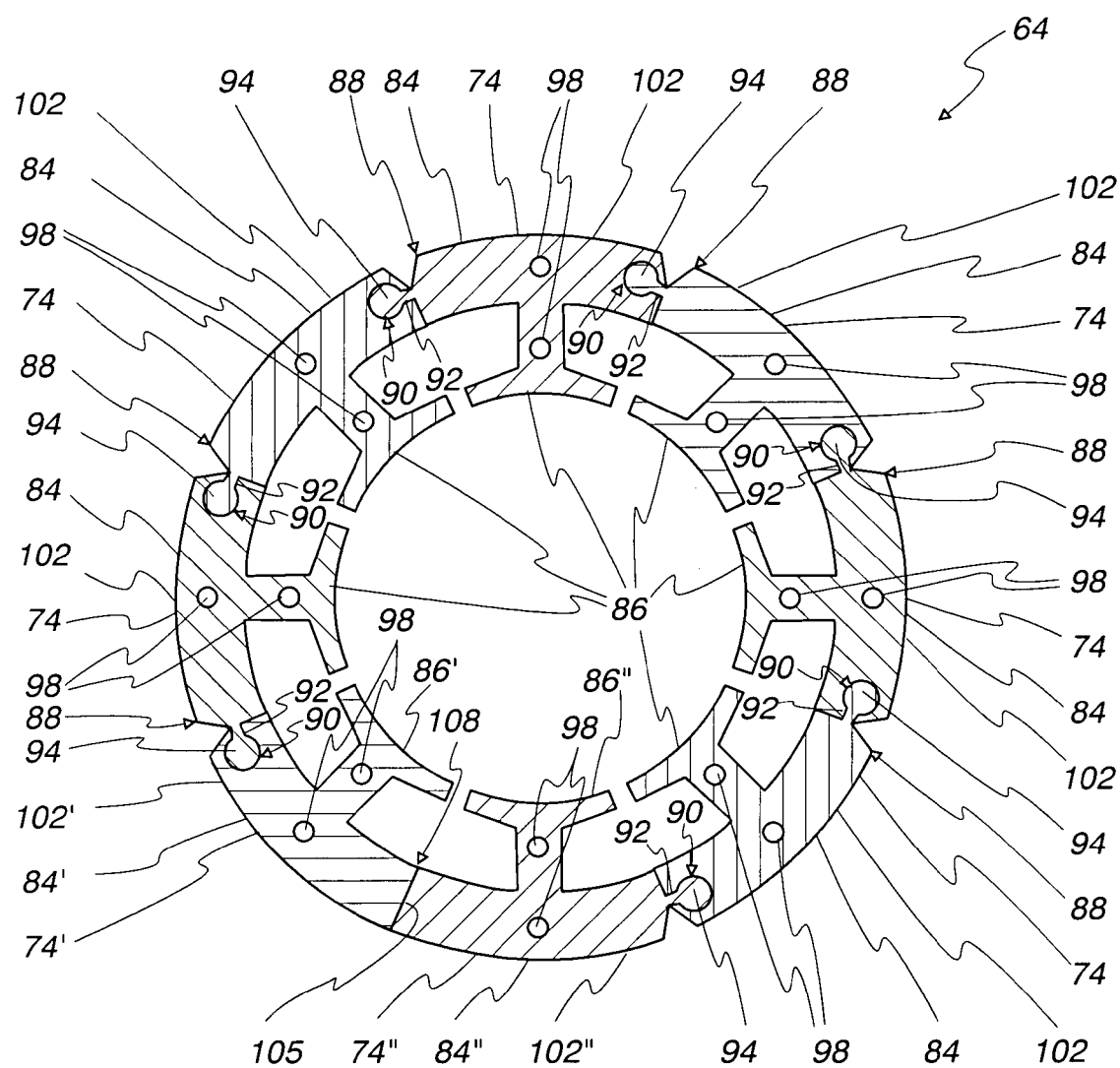
FIG. 3 is a plan view of a second configuration magnetic pole sheet layer on the layered core of FIG. 1.

As shown in FIGS. 2 and 3, each first configuration magnetic pole sheet layer 62 is formed by arranging several (in this embodiment eight (8)) arcuate yoke parts 72,72',72" in a ring so that they are in contact with each other. Each second configuration magnetic pole sheet layer 64 is formed by arranging several (in this embodiment eight (8)) arcuate yoke parts 74,74',74" in a ring so that they are in contact with each other.

As shown in FIGS. 2–5, the arcuate yoke parts 72 on the first configuration magnetic pole sheet layer 62 each have an arcuate segment 76 on the outer circumference thereof and a magnetic pole 78 extending contiguously radially inwards from the arcuate segment 76. On one circumferential end 80 of each arcuate segment 76, a circular receptacle 82 is formed which defines a female connector/receptacle 82 which has a restricted entryway 83 and receives a part of the second configuration magnetic pole sheet layer 64, as hereinafter explained.

The arcuate yoke parts 74 on the second configuration magnetic pole sheet layer 64 each have an arcuate segment 84 on the outer circumference thereof and a magnetic pole 86 extending contiguously radially inwards from the arcuate segment 84. On one circumferential end 88 of each arcuate segment 84, a male connector 90 is formed. The male connector 90 has an elongate stem 92 which carries a rounded head 94 that is complementary in shape to the female connector/receptacle 82. The stems 92 are dimensioned to pass through the restricted entryways 83. The head 94 of the male connector 90 on each arcuate segment 84 on each second configuration magnetic pole sheet layer 64 is mated with a female connector/receptacle 82 on an underlying first configuration magnetic pole sheet layer 62. Depressions 96,98 are formed at radially spaced locations on each of the arcuate yoke parts 72,74 at the circumferential center of the arcuate segments 76,84 and magnetic poles 78,86. The depressions 96,98 may be of a commonly known construction so as to define a protrusion on one side and a receptacle for receiving such a protrusion on the other side. With the magnetic pole sheet layers 62,64 stacked, the protrusions formed by the depressions 96,98 nest in immediately over-/underlying receptacles.

Also, outer arcuate edges 100,100',100" of the arcuate segments 76,76',76" and the outlines of the magnetic poles 78,78',78" on the arcuate segments 76,76',76" are preferably made essentially identical to the outer arcuate edges 102, 102',102" of the arcuate segments 84,84',84" and the outlines of the magnetic poles 86,86',86" on the arcuate segments 84,84',84" so that the layered core 60 has a substantially uniform cross-sectional shape over its thickness L.

As shown in FIGS. 2 and 3, modified yoke parts 72',72"; 74',74" are provided on the first and second configuration magnetic pole sheet layers 62,64. The yoke part 72' does not have a female connector/receptacle 82 at its end 104, with the yoke part 74' likewise not having a male connector 90 at its end 105. The outer edges 100',102' of these yoke parts 72',74' are essentially identical with their respective yoke parts 72,74. The yoke parts 72',72" contact each other at a straight cut line 106 and the yoke parts 74',74" contact each other at a straight cut line 108. Depressions 96,98 are likewise formed in the yoke parts 72',72" and 74'74", respectively.

Thus, the first configuration magnetic pole sheet layer 62 has a continuous ring shape defined by the yoke parts 72,72',72", with the second configuration magnetic pole sheet layer 64 having a continuous ring shape defined by the yoke parts 74,74',74". The layered core 60 is produced by alternatingly stacking the magnetic pole sheet layers 62,64 to a prescribed thickness, and in so doing, nesting the projections defined by the depressions 96,98 on an under-/overlying yoke part 72,72',72", 74,74',74".

Figure 4:
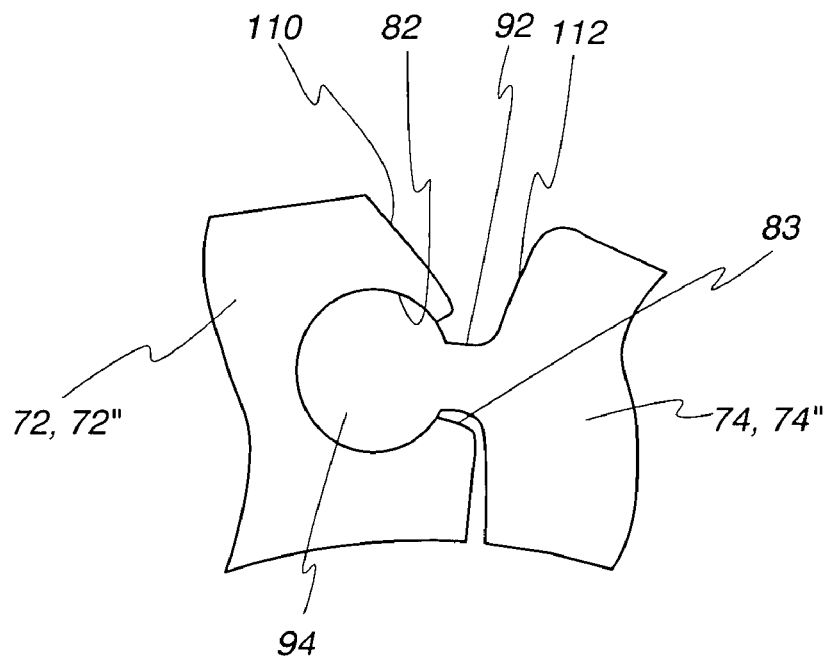
FIG. 4 is an enlarged, fragmentary, plan view of a pivot connection between adjacent, joined annular yoke parts on over-/underlying magnetic pole sheet layers as in FIGS. 2 and 3.
Figure 5:
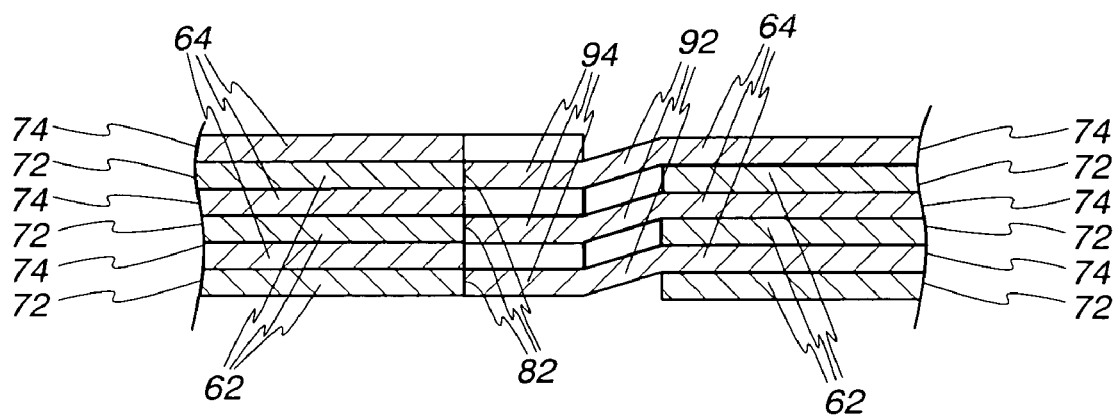
FIG. 5 is an enlarged, fragmentary cross-sectional view of connections between adjacent, stacked, annular yoke parts on the layered core of FIG. 1.

As shown in FIGS. 4 and 5, each head 94 can be aligned to be inserted into an adjacent female connector/receptacle 82 by bending the associated stem 92, as shown in FIG. 5. The head 94 can thus be connected to pivot freely in the female connector/receptacle 82. As shown in FIG. 4, a notch 110 can be formed at the outer circumference of the yoke parts 72,72", with a like notch 112 provided in the yoke parts 74,74".

By means of this configuration of parts, the outer ring yoke 66 can be constructed from the stacked yoke parts 72,72',72", 74,74',74", with the magnetic poles 70 constructed from the stacked magnetic pole layers by alternatingly layering a prescribed number of the pole sheet layers 62,64. Also, the layered core 60 can be produced from one outer ring yoke 66 and magnetic pole piece 70, respectively, each of a thickness L.

As shown in FIG. 1, the cut lines 106,108 coincide on the layered core 60 at a cut line 114. As such, the yoke parts 72,72',72", 74,74',74" are connected to pivot freely, so that the layered core 60 can be separated at the cut line 114. Further, with the respective notches 110,112 on the yoke parts 72,72", 74,74", after separation at the cut line 114, the ring yoke segments 68 on the layered core 60 can be pivoted relative to each other to be arranged in substantially a straight line. Due to this, each magnetic pole 70 is exposed to facilitate wire winding.

Figure 6:
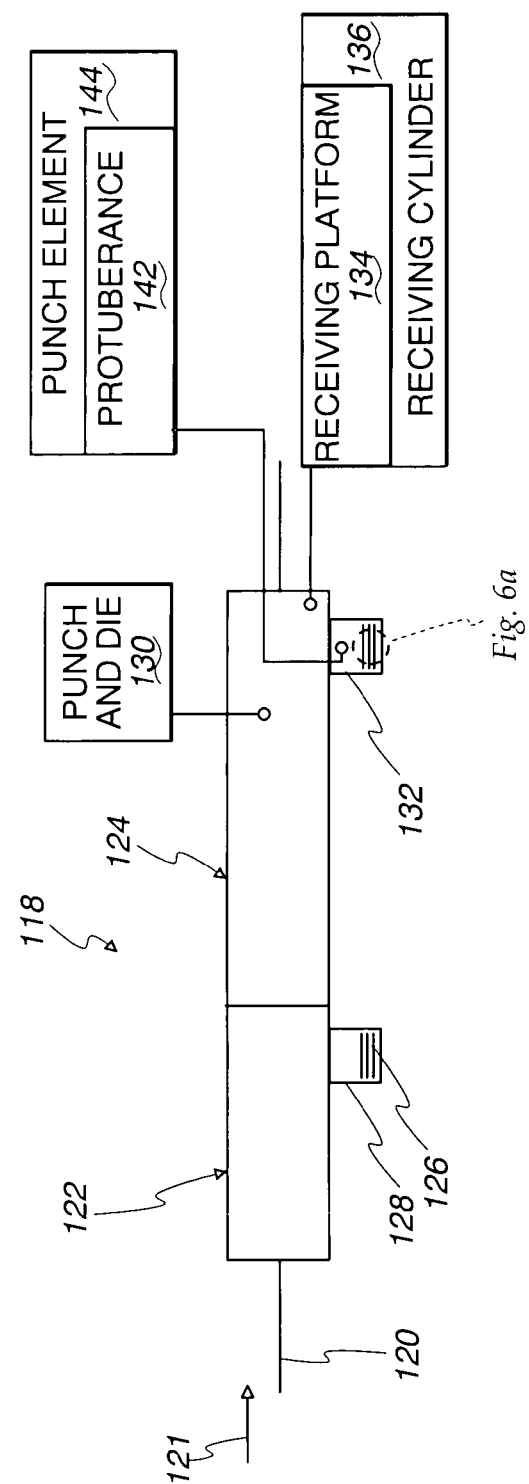
FIG. 6 is a schematic drawing showing the structure of one form of a press station for the manufacture of the layered core of FIG. 1.
Figure 6A:
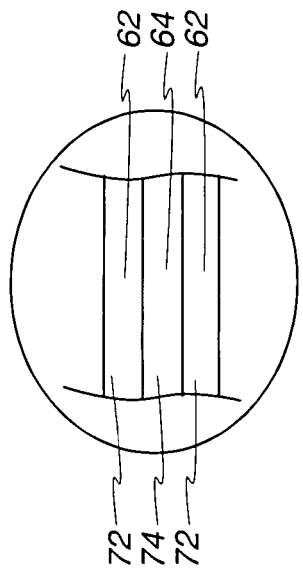
FIG. 6*a* is an enlarged, elevation view of a section of the press station within the circle in FIG. 6.

Next, one form of the inventive manufacturing method for the layered core 60 will be described. In FIG. 6 a schematic drawing of a press station 118 for producing the layered core 60 is shown. A metal sheet/laminate 120, from which the yoke parts 72,72',72", 74,74',74" are punched out, is conveyed to the press station 118 in the direction of the arrow 121. A rotor core production area 122 is provided on the upstream end of the press station 118 and a stator core production area 124 is provided at the downstream end of the press station 118.

In the rotor core production area 122, several punching out stages progressively form the outer circumference of rotor core laminations 126. In the stator core production area 124, several punching out stages progressively form the outer circumferential edges of the yoke parts 72,72',72", 74,74',74". The metal sheet/laminate 120 is conveyed intermittently at a prescribed speed with coordinated, simultaneous punching out of components in the rotor and stator core production areas 122,124 taking place.

As the metal sheet/laminate 120 conveyed to the rotor core production area 122 passes through the rotor core production area 122, the outer circumference of the rotor core laminations 126 is formed in stages and the final outer circumference of the rotor core laminations 126 is made through a punch and die, not shown in the figure. The rotor core laminations 126 are punched into a die receptacle 128, and against rotor core laminations 126 previously layered onto the receiving platform of a receiving cylinder. Through this process, the rotor core is formed.

The metal sheet/laminate 120, from which each of the rotor core laminations 126 is struck, is conveyed to the stator core production area 124. Upon the metal sheet/laminate 120 passing into the stator core production area 124, first the outer circumferences of the yoke parts 72,72',72" is formed in stages and the final punching out of the yoke parts 72,72',72" is carried out with a punch and die 130. The yoke parts 72,72',72" are punched into die receptacles 132 having a ring to form the yoke parts 72,72',72" into the first configuration magnetic pole sheet layer 62, as shown in FIG. 2. This pole sheet layer 62 is placed on a receiving platform 134 of a receiving cylinder 136 which freely advances into the die receptacle 132. The outer circumferences of the yoke parts 74,74',74" are formed progressively and, after a final punching operation, these yoke parts 74,74',74" are arranged in the die receptacle 132 in a ring form to define the second configuration magnetic pole sheet layer 64, as shown in FIG. 3. The sheet layer 64 is stacked onto the pole sheet layer 62, already positioned on the receiving platform 134. Depressions 96,98 are formed in the stacked yoke parts 72,72',72", 74,74',74".

The protrusions formed by the depressions 96,98 are directed into the receptacles defined by the depressions 96,98 by dropping the magnetic pole sheet layers 62,64 into the die receptacle 132 and applying a vertical load up and down through the receiving cylinder 136 at the time that the outer circumference punching is carried out. A protuberance 142, on a punch element 144, causes the stems 92 to bend, whereby the associated head 94 is driven into a female connector/receptacle 82.

With the sheet layers 62,64 stacked and processed as described above, the yoke parts 72,72',72", 74,74',74" are freely pivotable relative to each other.

Each time a sheet layer 64 is stacked onto a sheet layer 62 and the punch element 144 driven into the die receptacle 132, each of the yoke parts 72,72',72", 74,74',74" is connected to freely pivot relative to that yoke part 72,72',72", 74,74',74" to which it is joined. Then, by repeatedly layering the sheet layers 62,64 to the desired layering thickness, the manufacture of the layered core 60 can be completed.

The invention is not limited to the method described above. Layering and subsequent pivoting connection of elements may also be done by making punch outs which allow several, i.e., more than two (2), of the magnetic pole sheet layers 62,64 to be stacked prior to the press connection steps. Providing depressions 96,98 in identical positions on all of the yoke parts 72,72',72", 74,74',74" makes interchange of the yoke parts 72,72',72", 74,74',74" possible. Further, with the multiple stacked pole sheet layers 62,64 in place, seating of the protrusions in the depressions 96,98 and bending of the stems 92 and seating of the heads 94 can take place simultaneously. The press force required to effect this can be increased as dictated by the number of stacked layers.

Figure 7:
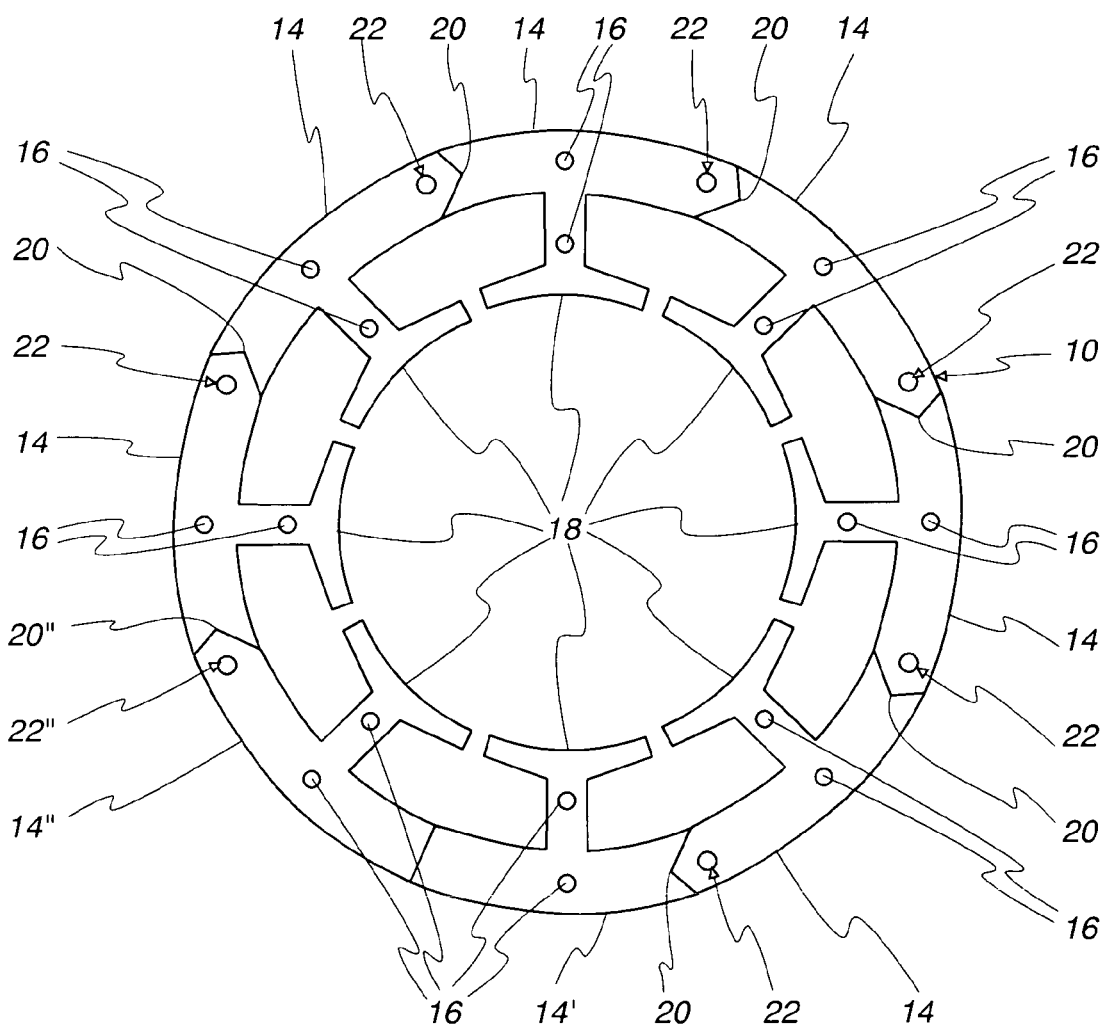
FIG. 7 is a plan view of a prior art first configuration magnetic pole sheet layer usable to form a layered core of the type shown in FIG. 1.
Figure 8:
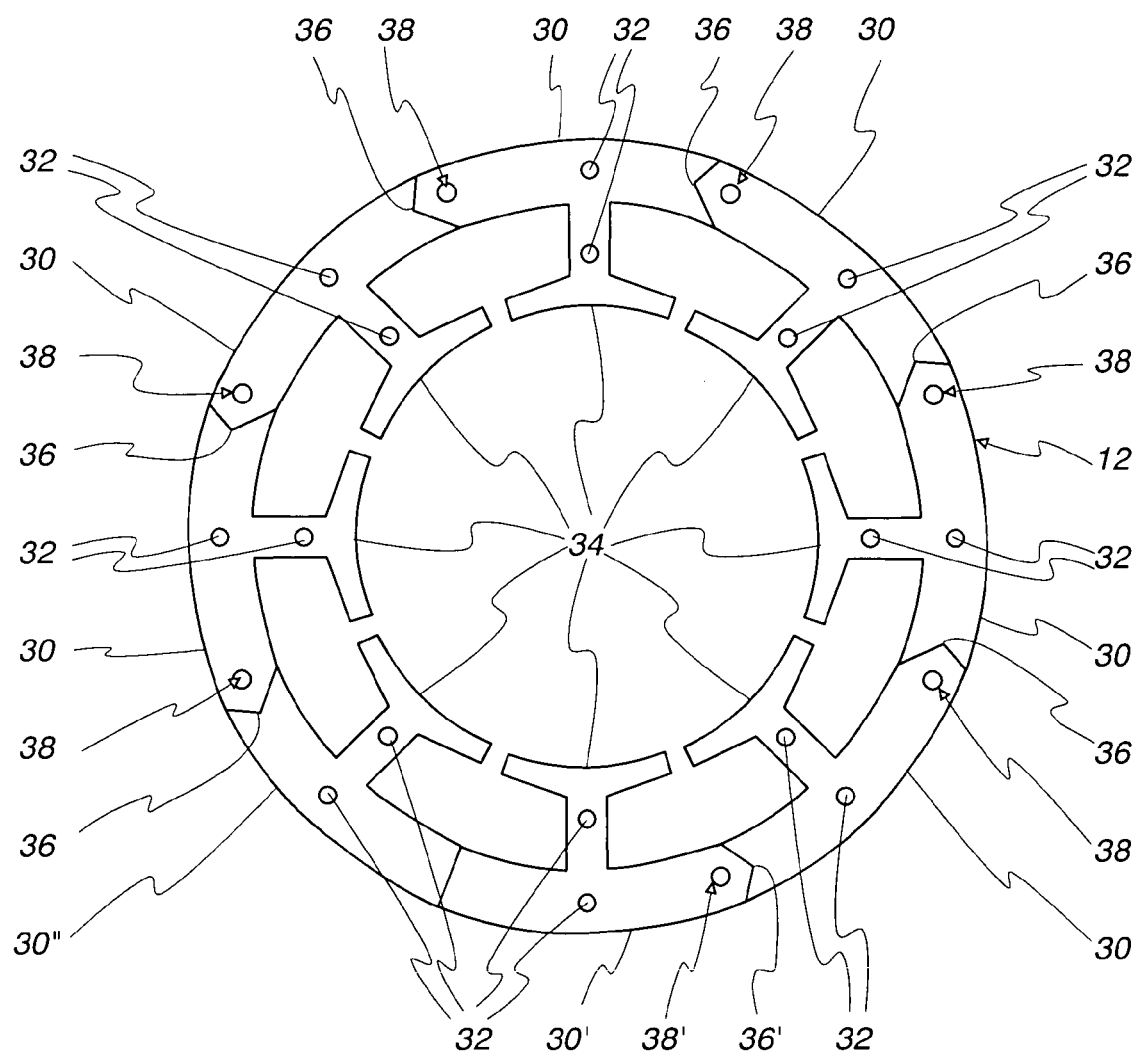
FIG. 8 is a plan view of a prior art second configuration magnetic pole sheet layer stackable with the magnetic pole sheet layer in FIG. 7 to produce a layered core of the type shown in FIG. 1.
Figure 9:
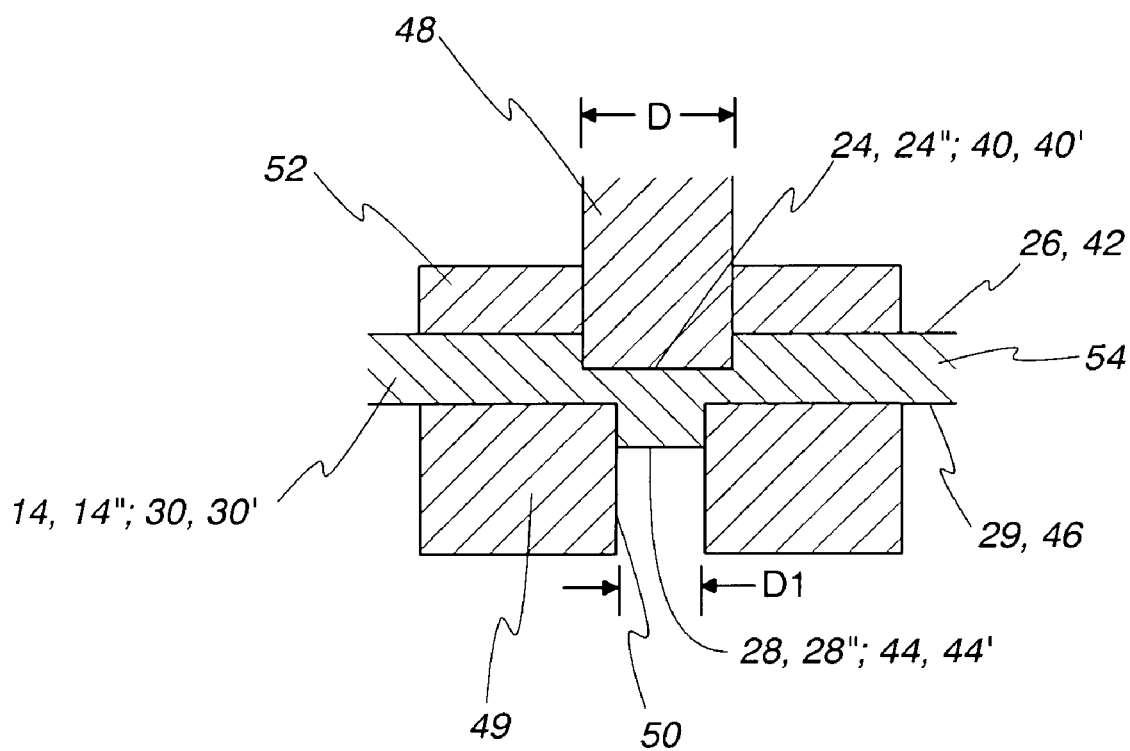
FIG. 9 is an enlarged, fragmentary cross-sectional view of a prior art die system usable to form connectors on cooperating yoke parts on the magnetic pole sheet layers of FIGS. 7 and 8.

With the inventive manufacturing method for the layered core 60 of the invention, because the yoke parts 72,72',72", 74,74',74" are constructed so that they extend circumferentially substantially equally in opposite directions from the magnetic poles 70,86, stacking and pivoting interconnection for relative pivoting movement is facilitated. Additionally, because the connections between the yoke parts 72,72',72", 74,74',74" do not require cooperating convex and concave parts as in the prior art structures shown in FIGS. 7–9, the yoke parts 72,72',72", 74,74',74" can be formed from thin metal laminate to stably establish the pivotable connections.

While the invention has been described with particular reference to the drawings, it should be understood that various modifications could be made without departing from the spirit and scope of the present invention.

The invention claimed is:

1. A method of manufacturing a layered core having a central axis, an annular ring yoke, and a plurality of magnetic poles projecting radially inwardly from the annular ring yoke toward the central axis, the method comprising the steps of:
arranging a first plurality of yoke parts so as to define a first configuration magnetic pole sheet layer having first and second oppositely facing sides;
arranging a second plurality of yoke parts so as to define a second configuration magnetic pole sheet layer having third and fourth oppositely facing sides;
stacking the first plurality of yoke parts and second plurality of yoke parts, one upon the other, so that the second side of the first configuration magnetic pole sheet layer is placed against the third side of the second configuration magnetic pole sheet layer;
providing a circumferentially opening first female connector on a first yoke part in the first plurality of yoke parts on the first configuration magnetic pole sheet layer;
providing a first male connector on a second yoke part in the second plurality of yoke parts on the second configuration magnetic pole sheet layer; and
directing the first male connector into the first female connector so that the first male connector is pivotable relative to the first yoke part around an axis that is substantially parallel to the central axis.

2. The method of manufacturing a layered core according to claim 1 wherein the step of directing the first male connector into the first female connector comprises bending one of the first and second yoke parts to axially align the first male connector and the first female connector.

3. The method of manufacturing a layered core according to claim 2 wherein the step of bending one of the first and second yoke parts comprises bending the one of the first and second yoke parts with the first plurality of yoke parts stacked upon the second plurality of yoke parts.

4. The method of manufacturing a layered core according to claim 1 wherein the step of directing the first male connector into the first female connector comprises bending the second yoke part to axially align the first male connector and the first female connector.

5. The method of manufacturing a layered core according to claim 1 further comprising the step of stacking additional magnetic pole sheet layers to produce a desired axial dimension for the layered core.

6. The method of manufacturing a layered core according to claim 1 wherein the step of arranging the first plurality of yoke parts comprises providing (a) a third yoke part in the first plurality of yoke parts on the first configuration magnetic pole sheet layer having a second connector similar to one of the first male connector and first female connector and (b) a fourth yoke part in the second plurality of yoke parts on the second configuration magnetic pole sheet layer having a third connector similar to the other of the first male connector and first female connector, and the second and third connectors are configured to cooperate with each other in the same manner that the first male connector cooperates with the first female connector.

7. The method of manufacturing a layered core according to claim 1 wherein the step of providing a first female connector on the first yoke part comprises providing a rounded opening on the first yoke part and a restricted entryway communicating with the rounded opening.

8. The method of manufacturing a layered core according to claim 7 wherein the step of providing a first male connector on the second yoke part comprises providing a stem with a head on the stem.

9. The method of manufacturing a layered core according to claim 1 wherein one of the yoke parts in the first plurality of yoke parts has a different configuration than one of the yoke parts in the second plurality of yoke parts against which the one yoke part is directly stacked.

10. A method of manufacturing a layered core having a central axis, an annular ring yoke, and a plurality of magnetic poles projecting radially inwardly from the annular ring yoke toward the central axis, the method comprising the steps of:
arranging a first plurality of yoke parts so as to define a first configuration magnetic pole sheet layer having first and second oppositely facing sides;
arranging a second plurality of yoke parts so as to define a second configuration magnetic pole sheet layer having third and fourth oppositely facing sides;
stacking the first plurality of yoke parts and the second plurality of yoke parts, one upon the other, so that the second side of the first configuration magnetic pole sheet layer is placed against the third side of the second configuration magnetic pole sheet layer;

providing a circumferentially opening first female connector on a first yoke part in the first plurality of yoke parts on the first configuration magnetic pole sheet layer;

providing a first male connector on a second yoke part in the second plurality of yoke parts on the second configuration magnetic pole sheet layer; and directing the first male connector into the first female connector so that the first male connector is pivotable relative to the first yoke part around an axis that is substantially parallel to the central axis, said method further comprising the step of forming at least one depression in each of the first yoke part and a third yoke part, the at least one depression on the first yoke part spaced from the first female connector, the at least one depression on each of the first and third yoke parts defining a projection and receptacle which cooperate to maintain the first and third yoke parts in a desired relationship.

* * * * *